(No Model.)

J. H. LINCOLN.
DENTAL ENGINE HAND PIECE.

No. 274,008. Patented Mar. 13, 1883.

WITNESSES:
Thos. Houghton.
John C. Kernon

INVENTOR:
James H. Lincoln
BY
ATTORNEYS.

UNITED STATES PATENT OFFICE.

JAMES H. LINCOLN, OF CHATTANOOGA, TENNESSEE.

DENTAL-ENGINE HAND-PIECE.

SPECIFICATION forming part of Letters Patent No. 274,008, dated March 13, 1883.

Application filed July 13, 1882. (No model.)

*To all whom it may concern:*

Be it known that I, JAMES H. LINCOLN, of Chattanooga, in the county of Hamilton and State of Tennessee, have invented a new and Improved Hand-Piece Attachment for Dental Engines and for other Purposes; and I do hereby declare that the following is a full, clear, and exact description of the same, reference being had to the accompanying drawings, making part of this specification.

This invention relates to improvements in hand-piece attachments for dental engines or other purposes, having for its object to enable the manipulation or working and retention of the drill at any angle desired; and it consists in the employment of elbows coupled together in such a manner as to permit the adjustment of one of the same at any point in a circle, combined with shafts and gearings capable of transmitting motion to the drill.

It consists, further, of a holding or adjusting screw in connection with the revolving elbow, substantially as hereinafter more fully set forth.

Figure 1:
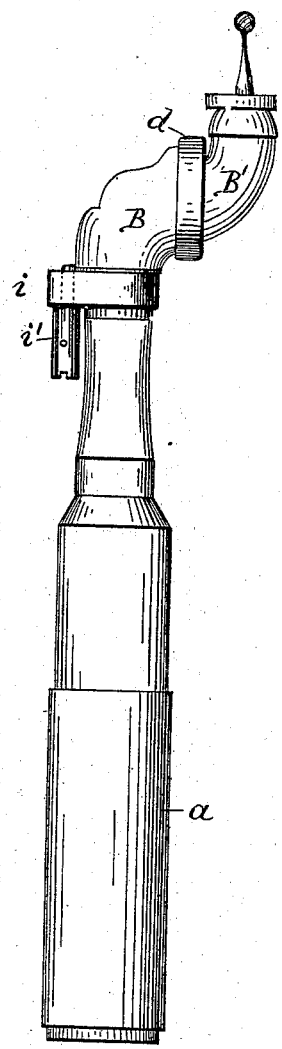
Figure 2:
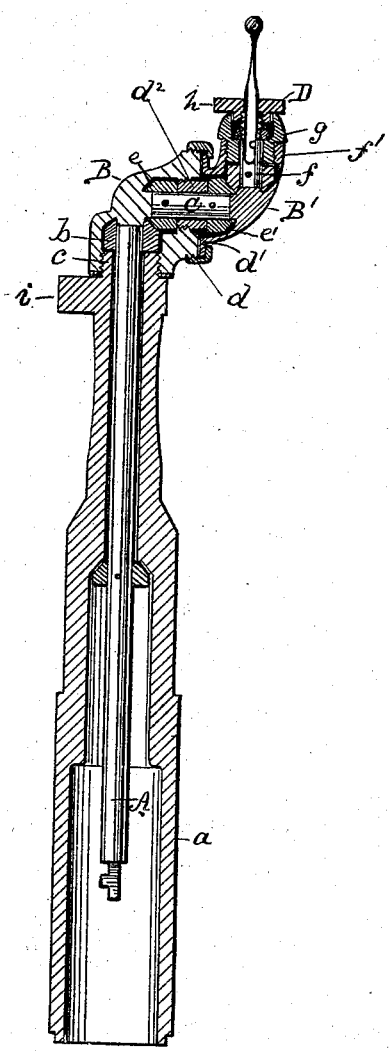

In the accompanying drawings, Figure 1 is a side view of my improved hand-piece attachment for dental engines or other purposes. Fig. 2 is a longitudinal central section thereof.

In carrying out my invention I employ a shaft, A, bearing in a tube or case, a, said shaft adapted to be driven by a dental engine, to which the tube or case a is designed to be attached. The shaft A has a shoulder resting against a shoulder on the inside of said tube, while at one end thereof is affixed a beveled pinion, b, whose under side bears against the end of a screw-threaded collar, c, of the tube or case a. This arrangement enables the holding of the shaft in position in the tube or case, while permitting its rotation.

B B' are two hollow or tubular elbows coupled together by a flanged ring or annulus, d, screwed on one elbow and fitting against the outside of a flange, d', formed on the other elbow, as clearly shown in the sectional view. The purpose of this is to allow the adjustment of one of said elbows to any point in a circle to accordingly affect the drill. The elbow B has a screw-thread on its inside, which allows it to be screwed upon the screw-threaded collar c of the tube or case a. The elbow B' has also a screw-thread at its outer end, the function of which will be seen presently.

C is a shaft which has its bearings and is held in position in a screw-threaded sleeve or box, $d^2$, screwed to the elbow B, said shaft having its ends projecting into the two elbows B B'. The ends of the shaft C are provided with beveled pinions e e', arranged to project also into said elbows. The pinion e gears with the pinion b of the shaft A, while the pinion e' gears with the beveled pinion f on the tubular shaft f', having jaws which hold the drill. Upon this shaft is fitted, so as to revolve independent thereof, but at the same time be incapable of separation therefrom, an annular nut, g, which is screwed into the screw-threaded or outer end of the elbow B'. This arrangement, while holding the drill in place and its pinion in gear with the pinion of the shaft C, permits the rotation of the drill.

D is a nut which holds the drills between the screw-threaded jaws of the shaft f, and has an annular flange h, which fits into the outer edge of the nut g. In the center of the disk or nut D is an aperture for the passage through it of the drill, and whose edge is adapted to fit sufficiently close to the drill-shank to prevent the admission at this point of foreign substances.

Upon the contiguous end of the case or tube a to the elbows is an apertured projection or plate, i, having a set or holding screw, i', which is capable of bearing against the revolving elbow to permit the retention of latter with the drill at the desired angle or point of adjustment.

It will be observed that the drill is capable of adjustment and retention at any angle to a parallel plane with the operating or driving shaft within a circle, thus enabling the operator to use the drill in any possible position.

I claim and desire to secure by Letters Patent—

1. In a hand-piece attachment for dental engines or other purposes, the combination, with the operating or driving shaft and its pinion, of the elbows coupled together to revolve one upon the other, a second shaft having pinions, and the drill-shaft having a pinion, adapted for joint operation, substantially as and for the purpose set forth.

2. The combination, with the revolving elbow having the drill, of the shaft case or tube provided with a set or holding screw, substantially as described, as and for the purpose set forth.

JAMES H. LINCOLN.

Witnesses:
WINTHROP BARR,
J. H. RATHBURN.